(12) United States Patent
Peng et al.

(10) Patent No.: US 11,936,552 B2
(45) Date of Patent: Mar. 19, 2024

(54) METHOD AND DEVICE FOR IMPLEMENTING VPN CROSS-DOMAIN, AND BORDER NODE

(71) Applicant: ZTE Corporation, Shenzhen (CN)

(72) Inventors: Shaofu Peng, Shenzhen (CN); Feicai Jin, Shenzhen (CN); Haihua Tang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 45 days.

(21) Appl. No.: 17/264,976

(22) PCT Filed: Aug. 6, 2019

(86) PCT No.: PCT/CN2019/099512
§ 371 (c)(1),
(2) Date: Feb. 1, 2021

(87) PCT Pub. No.: WO2020/029976
PCT Pub. Date: Feb. 13, 2020

(65) Prior Publication Data
US 2021/0328906 A1   Oct. 21, 2021

(30) Foreign Application Priority Data

Aug. 7, 2018 (CN) .......................... 201810893131.5

(51) Int. Cl.
*H04L 45/02* (2022.01)
*H04L 12/46* (2006.01)
*H04L 45/50* (2022.01)

(52) U.S. Cl.
CPC .......... *H04L 45/04* (2013.01); *H04L 12/4633* (2013.01); *H04L 12/4641* (2013.01); *H04L 45/50* (2013.01)

(58) Field of Classification Search
CPC ..... H04L 45/04; H04L 45/50; H04L 12/4633; H04L 12/4641; H04L 45/34; H04L 45/02; H04L 45/74
See application file for complete search history.

(56) References Cited

U.S. PATENT DOCUMENTS

2015/0109904 A1   4/2015 Filsfils

FOREIGN PATENT DOCUMENTS

| CN | 1968178 A | 5/2007 |
| CN | 105049350 A | 11/2015 |

(Continued)

OTHER PUBLICATIONS

C. Filfils, "Segment Routing Architecture", Google Inc Jul. 2018.
(Continued)

*Primary Examiner* — Jianye Wu
(74) *Attorney, Agent, or Firm* — CANTOR COLBURN LLP

(57) ABSTRACT

Provided is a method and device for implementing Virtual Private Network (VPN) cross-domain, and a border node. The method includes that: a border node receives a advertisement message which carries VPN route information and is sent by a first node to a second node, wherein the border node supports Internet Protocol Version 6 Segment Routing (SRv6) capability, and the first node and the second node belong to different domains; and the border node assigns VPN identity information to a VPN route corresponding to the VPN route information, adds the VPN identity information into the advertisement message and sends the advertisement message to the second node, wherein the VPN identity information includes at least one of: a VPN Segment ID (SID) and a VPN label.

19 Claims, 3 Drawing Sheets

(56) References Cited

FOREIGN PATENT DOCUMENTS

| | | | |
|---|---|---|---|
| CN | 105323176 A | | 2/2016 |
| CN | 106789619 A | * | 5/2017 |
| CN | 106789619 A | | 5/2017 |
| CN | 107637031 A | | 1/2018 |
| WO | 2017141079 A1 | | 8/2017 |
| WO | WO-2019005949 A1 | * | 1/2019 ......... H04L 12/4633 |

OTHER PUBLICATIONS

G. Dawra, "BGP Signaling of IPv6-segment-routing-based VPN Networks-draft-dawra-idr-srv6-vpn-01.txt", Softbank Telecom Japan, Sep. 11, 2017.

International Search Report for corresponding application PCT/CN2019/099512 filed Aug. 6, 2019; dated Oct. 29, 2019.

* cited by examiner

METHOD AND DEVICE FOR IMPLEMENTING VPN CROSS-DOMAIN, AND BORDER NODE

CROSS REFERENCE

This application is a National Stage Filing of the PCT International Application No. PCT/CN2019/099512 filed on Aug. 6, 2019, which claims priority to patent application No. 201810893131.5 filed on Aug. 7, 2018 before China National Intellectual Property Administration (CNIPA), the entirety of which is herein incorporated by reference.

TECHNICAL FIELD

The present disclosure relates, but is not limited, to the field of data communications.

BACKGROUND

In actual network deployment, services such as an internal voice service of the operator and a VPN dedicated line service of enterprise clients are often across multiple Autonomous Systems (AS) or Interior Gateway Protocol (IGP) areas. How the VPN effectively crosses multiple ASs (or IGP areas) is also a problem that the VPN over SRv6 needs to focus on and solve. The domain that is crossed may be the domain that has been upgraded to support the SRv6 capability (called a SRv6 domain) or the traditional MPLS domain that has not been upgraded to support the SRv6 capability.

SUMMARY

Embodiments of the present disclosure provide a method for implementing VPN cross-domain. The method includes the following operations. A border node receives an advertisement message which carries VPN route information and is sent by a first node to a second node, wherein the border node supports SRv6 capability, and the first node and the second node belong to different domains. The border node assigns VPN identity information to a VPN route corresponding to the VPN route information, adds the VPN identity information into the advertisement message and sends the advertisement message to the second node, wherein the VPN identity information includes at least one of: a VPN SID and a VPN label.

The embodiments of the present disclosure also provide a device for implementing VPN cross-domain, which is applied to a border node supporting SRv6 capability, and includes: a receiving module and an assigning module. The receiving module is configured to receive an advertisement message which carries VPN route information and is sent by a first node to a second node, wherein the first node and the second node belong to different domains. The assigning module is configured to assign VPN identity information to a VPN route corresponding to the VPN route information, add the VPN identity information into the advertisement message, and send the advertisement message to the second node, wherein the VPN identity information includes at least one of: a VPN SID and a VPN label.

The embodiments of the present disclosure also provide a border node, which supports SRv6 capability, and includes: a processor; a memory configured to store an instruction executable for the processor; and a transmission device configured to send and receive information for communication under control of the processor. The processor is configured to: control the transmission device to receive an advertisement message which carries VPN route information and is sent by a first node to a second node, wherein the first node and the second node belong to different domains; and assign VPN identity information to a VPN route corresponding to the VPN route information, add the VPN identity information into the advertisement message, and send the advertisement message to the second node, wherein the VPN identity information includes at least one of: a VPN SID and a VPN label.

The embodiments of the present disclosure also provide a computer-readable storage medium, which stores a computer-executable instruction. The computer-executable instruction is used to perform any method described in the embodiments of the present disclosure.

BRIEF DESCRIPTION OF THE DRAWINGS

The accompanying drawings described herein are used to provide a deeper understanding of the present disclosure, and constitute a part of the present application. The accompanying drawings are used for illustrating the technical solution of the present disclosure together with the embodiments of the present disclosure. The drawings and the exemplary embodiment do not constitute limitations to the present disclosure.

DETAILED DESCRIPTION OF THE EMBODIMENTS

Figure 1:
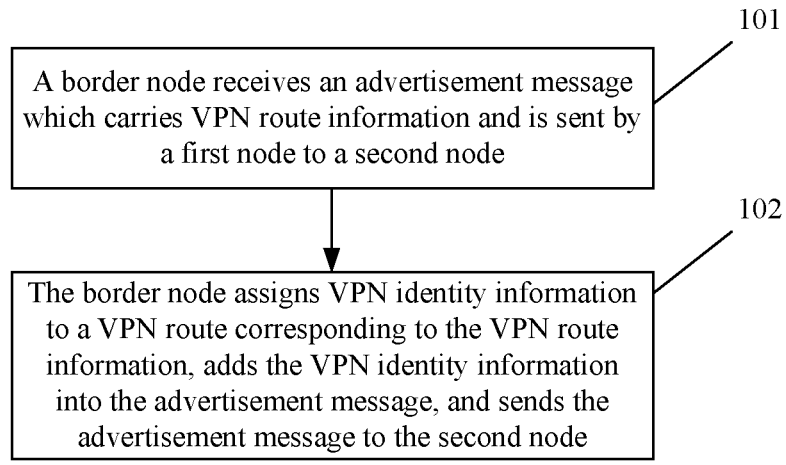
FIG. 1 is a flowchart of a method for implementing VPN cross-domain according to an embodiment of the present disclosure.

The embodiments of the present disclosure are described below in detail with reference to the drawings. It is to be noted that embodiments in the present application and characteristics in the embodiments may be combined to derive other embodiments not explicitly described.

The operations shown in the flowchart of the accompanying drawings can be executed in a computer system which is able to run a group of computer executable instructions. Moreover, although a logical sequence is shown in the flowchart, in some cases, the shown or described operations can be performed in a sequence different from that described herein.

In terms of standards related to routing technology, draft-ietf-spring-segment-routing-15 describes the architecture of segment routing. The segment routing technology enables a node to specify a forwarding path for a specific packet, rather than following the usual shortest path. By attaching information related to a segment list consisting of Segment IDs (SIDs), there is no need to maintain state information of each path on an intermediate node.

Another standard draft-filsfils-spring-srv6-network-programming-04 describes how to apply the segment routing to an Internet Protocol Version 6 (IPv6) forwarding plane, that is, IPv6 Segment Routing (SRv6). By inserting a Segment Routing Header (SRH), which contains the segment list represented by an IPv6 address list, into an IPv6 packet header, the destination address of the packet will be updated segment by segment to complete per-segment forwarding. The draft defines some SRv6 SIDs with different functions. The SRv6 SIDs that are related with Virtual Private Network (VPN) for a VPN scenario, or referred to as VPN SIDs, have two major types, that is, END.DT and END.DX. The two major types are subdivided into a number of subtypes for a Layer 2 Virtual Private Network (L2VPN), an Ethernet Virtual Private Network (EVPN) and a Layer 3 Virtual Private Network (L3VPN). Generally speaking, a local SID forwarding entry corresponding to the SID of the type END.DT provides corresponding VPN instance information, while a local SID forwarding entry corresponding to the SID of the type END. DX directly provides information directing the forwarding of a packet to a corresponding link.

Still another standard draft-dawra-idr-srv6-vpn-02 describes how to extend a Border Gateway Protocol (BGP). The VPN SID is included in a BGP update message to support a mechanism for a VPN service to be carried in the SRv6, known as VPN over SRv6 for short. The VPN over SRv6 is similar to VPN over Multi-Protocol Label Switching (MPLS) in the related art, but the key difference is that the VPN label is replaced by the VPN SID.

Three typical VPN cross-domain options, which are called option-A, option-B and option-C respectively, are proposed for traditional VPN over MPLS. The three typical VPN cross-domain options proposed for the traditional VPN over MPLS can be similarly applied to VPN over SRv6. However, among the three options, option-A requires configuration of a Virtual Routing Forwarding (VRF) instance on an Autonomous System Boundary Router (ASBR) or Area Border Router (ABR), and therefore is only applicable in the case of a small number of VPNs. Option-C is relatively difficult to be used in a heterogeneous network consisting of a VPN over SRv6 domain and a MPLS domain, because a Provider Edge (PE) device in a SRv6 domain and a PE device in the MPLS domain need to have the same capability, for example, the PE devices need to support an operation of VPN label or an operation of VPN SID, moreover the ASBR (or the ABR) should also be upgraded to support the adhesion of heterogeneous network. Among the three options, option-B is the only option that meets the requirement for smooth evolution of network, since the implementation of the option-B simply requires the upgrading of the ASBR (or ABR) to support the adhesion of heterogeneous networks.

However, the cross-domain option-B cannot effectively support VPN over SRv6.

Therefore, the embodiments of the present disclosure propose a method and device for implementing VPN cross-domain, and a border node. The solutions proposed in the embodiments substantially address one or more of the problems caused by limitations and shortcomings of related art. According to the embodiments of the present disclosure, the cross-domain option-B is enabled to support VPN over SRv6.

In the embodiments of the present disclosure, a capability of assigning a VPN SID is configured to be supported on a border node that connects domains to domains and has been upgraded to support SRv6 capability. A border node having this capability can assign a VPN SID and add (i.e., contain) the VPN SID into an advertisement message when the border node advertises the received VPN route, that the other node advertises to this border node, to another node with the SRv6 capability. A corresponding local SID forwarding entry is created for the VPN SID on the border node, and the FUNCTION of the local SID forwarding entry is a new type, indicating that an incoming SRv6 SID is swapped to an outgoing SRv6 SID or MPLS label. If the border node also supports MPLS, a capability of assigning a VPN label is reserved. A border node which has the capability of assigning a VPN label is able to assign a VPN label and add (i.e., contain) the VPN label into an advertisement message when the border node advertises the received VPN route that the other node advertises to this border node to another node with a MPLS capability only. A corresponding In-label Mapping (ILM) forwarding entry is created for the VPN label on the ASBR (ABR) node, and the label operation of the ILM forwarding entry is swapping an incoming MPLS label to an outgoing SRv6 SID or MPLS label.

As shown in FIG. 1, the method for implementing VPN cross-domain in the embodiments of the present disclosure may include operations S101 and S102 as follows.

At S101, a border node receives an advertisement message which carries VPN route information and is sent by a first node to a second node.

Here, the border node supports the SRv6 capability, and the first node and the second node belong to different domains.

Here, the border node may be ASBR or ABR.

For example, the advertisement message may be, but is not limited to be, BGP update.

For example, the advertisement message may include, but is not limited to include, at least one of: the advertisement message of an L2VPN, the advertisement message of an EVPN, and the advertisement message of an L3VPN.

In an embodiment, before S101, the method may further include an operation that the border node is configured to have a capability of assigning the VPN SID.

The capability means that when the ASBR (or ABR) node advertises the received VPN route, that the other node (namely the first node) advertises to this ASBR (or ABR) node, to another node (namely the first node) with the SRv6 capability, the ASBR (or ABR) node can assign the VPN SID and add (i.e., contain) the VPN SID into the advertisement message.

At S102, the border node assigns VPN identity information to a VPN route corresponding to the VPN route information, adds (i.e., contains) the VPN identity information into the advertisement message, and sends the advertisement message to the second node, wherein the VPN identity information includes at least one of: a VPN SID and a VPN label.

In an embodiment, the border node assigns the VPN identity information according to a capability of the second node.

The capability of the second node refers to whether the SRv6 capability or MPLS capability is supported by the second node.

There are three cases concerning whether the SRv6 capability or MPLS capability is supported.

In the first case, the second node only supports the SRv6 capability, and the border node assigns one of the following as the VPN identity information: a valid VPN SID; and a valid VPN SID and an invalid VPN label. For example, the invalid VPN label may be set as implicit null label 3 or other invalid values.

In the second case, the second node supports both the SRv6 capability and the MPLS capability, and the border node assigns one of the following as the VPN identity information according to a configuration policy: a valid VPN SID and a valid VPN label (the border node supports both the SRv6 capability and the MPLS capability); a valid VPN SID and an invalid VPN label; a valid VPN label and an invalid VPN SID (the border node supports both the SRv6 capability and the MPLS capability); a valid VPN SID; and a valid VPN label.

In the third case, the second node only supports an MPLS capability, and the border node assigns one of the following as the VPN identity information: a valid VPN label; and a valid VPN label and an invalid VPN SID.

In this case, the border node supports both the SRv6 capability and the MPLS capability.

It is to be noted that the above terms valid VPN SID and valid VPN label are emphasized to be compared with the invalid VPN SID and invalid VPN label. In the embodiments of the present disclosure, unless otherwise specified, the VPN SID refers to the valid VPN SID, and the VPN label refers to the valid VPN label.

Figure 2:
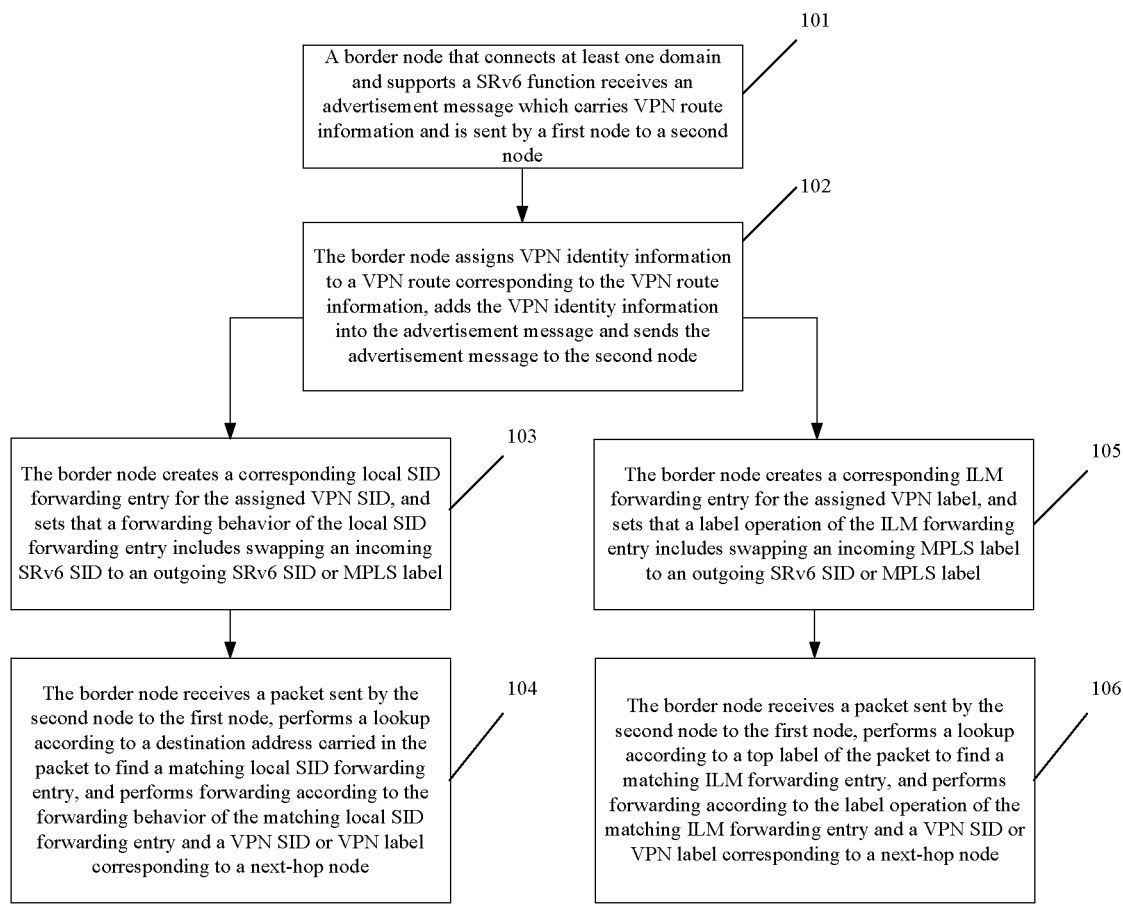
FIG. 2 is a flowchart of a method for implementing VPN cross-domain according to another embodiment of the present disclosure.

As shown in FIG. 2, in an embodiment, after S102, according to the difference in the VPN identity information assigned by the border node, the method may proceed to different operations.

(1) In a case where the VPN identity information includes the VPN SID, the method includes the following operation S103.

At S103, the border node assigns a corresponding local SID forwarding entry for the assigned VPN SID, and sets that a forwarding behavior of the local SID forwarding entry includes swapping an incoming SRv6 SID to an outgoing SRv6 SID or MPLS label.

Here, the FUNCTION of the local SID forwarding entry is a new type, indicating that the incoming SRv6 SID is swapped to the outgoing SRv6 SID or MPLS label. By setting the FUNCTION, the forwarding behavior of the local SID forwarding entry is set.

Here, the border node sets the forwarding behavior of the local SID forwarding entry according to the VPN identity information carried in the received advertisement message. Specifically, this operation may be implemented according to the following three cases.

In a first case where the advertisement message, which carries the VPN route information, received by the border node includes only a valid VPN SID, the border node sets that the forwarding behavior of the local SID forwarding entry is swapping the incoming SRv6 SID to the outgoing SRv6 SID.

In a second case where the advertisement message, which carries the VPN route information, received by the border node includes only a valid VPN label, the border node sets that the forwarding behavior of the local SID forwarding entry is swapping the incoming SRv6 SID to the outgoing MPLS label.

In a third case where the advertisement message, which carries the VPN route information, received by the border node includes a valid VPN SID and a valid VPN label, the border node sets the forwarding behavior of the local SID forwarding entry according to a configuration policy.

In this case, the border node may set, according to the configuration policy, that the forwarding behavior of the local SID forwarding entry is swapping an incoming SRv6 SID to an outgoing SRv6 SID or MPLS label.

In an embodiment, the method may further include the following operation: the border node floods, through an IGP, route information including the VPN SID to an IGP area to which the border node belongs.

Here, in order to enable other nodes in the network to perform routing on the VPN SID assigned by the border node, the border node floods, through the IGP, route information including the VPN SID to the IGP area to which the border node belongs. The route information including the VPN SID may be a VPN SID resource pool.

In an embodiment, the local SID forwarding entry created by the border node includes outgoing member forwarding information, and the outgoing member forwarding information includes an ID of a next-hop node, and a VPN SID or VPN label corresponding to the next-hop node.

Here, in a case where the forwarding behavior of the local SID forwarding entry is swapping the incoming SRv6 SID to the outgoing SRv6 SID, the next-hop node corresponds to the VPN SID; and in a case where the forwarding behavior of the local SID forwarding entry is swapping the incoming SRv6 SID to the outgoing MPLS label, the next-hop node corresponds to the VPN label.

In an embodiment, the local SID forwarding entry may include Equal-Cost Multipath Routing (ECMP) forwarding information or Fast Reroute (FRR) forwarding information generated according to the outgoing member forwarding information.

In an embodiment, the method may further include an operation S104. At S104, the border node receives a packet sent by the second node to the first node, performs a lookup according to a destination address carried in the packet to find a matching local SID forwarding entry, and performs forwarding according to the forwarding behavior of the matching local SID forwarding entry and the VPN SID or VPN label corresponding to the next-hop node.

Here, when the packet arrives at the border node, the border node looks up in a public network routing table according to a destination address carried in the packet to find a matching local SID forwarding entry.

For different forwarding behaviors, there are following two cases.

In a first case where the forwarding behavior of the matching local SID forwarding entry is swapping the incoming SRv6 SID to the outgoing SRv6 SID, the border node modifies the destination address of the packet into the VPN SID corresponding to the next-hop node, and forwards the packet to the next-hop node.

In a second case where the forwarding behavior of the matching local SID forwarding entry is swapping the incoming SRv6 SID to the outgoing MPLS label, the border node removes an IPv6 packet header of the packet, encapsulates the MPLS label, sets a top label of the packet as the VPN label corresponding to the next-hop node, and forwards the packet to the next-hop node.

In this operation, the border node removes the IPv6 packet header of the packet and encapsulates an MPLS label instead, so as to modify the IPv6 packet into a MPLS packet. The border node set the top label of the packet as the VPN label corresponding to the next-hop node, and directly forwards the packet to the next-hop node.

(2) In a case where the VPN identity information includes the VPN label, the method includes the following operation S105.

At S105, the border node creates a corresponding ILM forwarding entry for the assigned VPN label, and sets that a label operation of the ILM forwarding entry includes swapping an incoming MPLS label to an outgoing SRv6 SID or MPLS label.

Here, the border node sets the label operation of the ILM forwarding entry according to the VPN identity information carried in the received advertisement message. Specifically, this operation may be implemented according to the following three cases.

In a first case where the advertisement message, which carries the VPN route information, received by the border node includes only a valid VPN SID, the border node sets that the label operation of the ILM forwarding entry is swapping the incoming MPLS label to the outgoing SRv6 SID.

In a second case where the advertisement message, which carries the VPN route information, received by the border node includes only a valid VPN label, the border node sets that the label operation of the ILM forwarding entry is swapping the incoming MPLS label to the outgoing MPLS label.

In a third case where the advertisement message, which carries the VPN route information, received by the border node includes a valid VPN SID and a valid VPN label, the border node sets the label operation of the ILM forwarding entry according to a configuration policy.

In this case, the border node may set, according to the configuration policy, that the label operation of the ILM forwarding entry is swapping the incoming MPLS label to the outgoing SRv6 SID or MPLS label.

In an embodiment, the ILM forwarding entry created by the border node includes outgoing member forwarding information, and the outgoing member forwarding information includes an ID of a next-hop node and a VPN SID or VPN label corresponding to the next-hop node.

Here, in a case where the label operation of the ILM forwarding entry is swapping the incoming MPLS label to the outgoing SRv6 SID, the next-hop node corresponds to the VPN SID; and in a case where the label operation of the ILM forwarding entry is swapping the incoming MPLS label to the outgoing MPLS label, the next-hop node corresponds to the VPN label.

In an embodiment, the ILM forwarding entry may include ECMP forwarding information or FRR forwarding information generated according to the outgoing member forwarding information.

In an embodiment, the method may further include an operation S106. As S106, the border node receives a packet sent by the second node to the first node, performs a lookup according to a top label of the packet to find a matching ILM forwarding entry, and performs forwarding according to the label operation of the matching ILM forwarding entry and the VPN SID or VPN label corresponding to the next-hop node.

For different label operations, there are following two cases.

In a first case where the label operation of the ILM forwarding entry is swapping the incoming MPLS label to the outgoing SRv6 SID, the border node pops out a top label of the packet, encapsulates an IPv6 packet header, modifies a destination address of the packet into the VPN SID corresponding to the next-hop node, and forwards the packet to the next-hop node.

In this operation, the border node pops out the top label of the packet and encapsulates the IPv6 packet header instead, so as to modify the MPLS packet into the IPv6 packet. The border node modifies the destination address of the packet into the VPN SID corresponding to the next-hop node, looks up in the routing table according to the VPN SID corresponding to the next-hop node to find matching route information, and forwards the packet to the next-hop node.

In a second case where the label operation of the ILM forwarding entry is swapping the incoming MPLS label to the outgoing MPLS label, the border node modifies the top label of the packet into the VPN label corresponding to the next-hop node, and forwards the packet to the next-hop node.

Through the embodiments of the present disclosure, the shortage of the SRv6 technology in terms of VPN cross-domain is overcome, and the VPN packet may be transferred across multiple SRv6 domains as well as across the heterogeneous network composed of the SRv6 domain and the MPLS domain.

Figure 3:
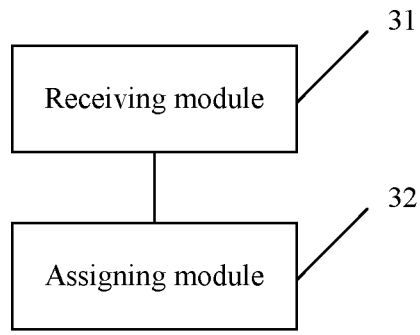
FIG. 3 is a schematic diagram of a device for implementing VPN cross-domain according to an embodiment of the present disclosure.

As shown in FIG. 3, the embodiments of the present disclosure also provide a device for implementing VPN cross-domain. The device is applied to the border node that connects at least one domain and supports the SRv6 capability. The device includes: a receiving module 31 and an assigning module 32. The receiving module 31 is configured to receive an advertisement message which carries VPN route information and is sent by a first node to a second node, wherein the first node and the second node belong to different domains. The assigning module 32 is configured to assign VPN identity information to a VPN route corresponding to the VPN route information, add the VPN identity information into the advertisement message, and send the advertisement message to the second node, wherein the VPN identity information includes at least one of: a VPN SID and a VPN label.

In an embodiment, the border node comprises at least one of the following: ASBR and ABR.

In an embodiment, the device may further include: a configuring module, configured to configure the border node to have the capability of assigning the VPN SID.

In an embodiment, the assigning module 32 is configured to assign the VPN identity information according to a capability of the second node.

In an embodiment, the second node only supports the SRv6 capability, and the assigning module 32 is configured to assign one of the following as the VPN identity information: a valid VPN SID; and a valid VPN SID and an invalid VPN label.

In an embodiment, the second node supports both the SRv6 capability and the MPLS capability, the assigning module 32 is configured to assign one of the following as the VPN identity information according to a configuration policy: a valid VPN SID and a valid VPN label; a valid VPN SID and an invalid VPN label; a valid VPN label and an invalid VPN SID; a valid VPN SID; and a valid VPN label.

In an embodiment, the second node only supports an MPLS capability, and the assigning module 32 is configured to assign one of the following as the VPN identity information: a valid VPN label; and a valid VPN label and an invalid VPN SID.

In an embodiment, the device may further include: a first creating module, configured to, in a case where the VPN identity information includes the VPN SID, create a corresponding local SID forwarding entry for the assigned VPN SID, and set that a forwarding behavior of the local SID forwarding entry includes swapping an incoming SRv6 SID to an outgoing SRv6 SID or MPLS label.

In an embodiment, the first creating module is configured to execute at least one of the following: in a case where the advertisement message, which carries the VPN route information, received by the receiving module only includes the valid VPN SID, setting that the forwarding behavior of the local SID forwarding entry is swapping the incoming SRv6 SID to the outgoing SRv6 SID; in a case where the advertisement message, which carries the VPN route information, received by the receiving module only includes the valid VPN label, setting that the forwarding behavior of the local SID forwarding entry is swapping the incoming SRv6 SID to the outgoing MPLS label; and in a case where the advertisement message, which carries the VPN route information, received by the receiving module includes the valid VPN SID and the valid VPN label, setting the forwarding behavior of the local SID forwarding entry according to a configuration policy.

In an embodiment, the device may further include: a flooding module, configured to flood, through an IGP, route information including the VPN SID to the IGP area to which the border node belongs.

In an embodiment, the local SID forwarding entry created includes outgoing member forwarding information, and the outgoing member forwarding information includes an ID of a next-hop node and a VPN SID or VPN label corresponding to the next-hop node.

In an embodiment, the device may further include: a first packet forwarding module, configured to receive a packet sent by the second node to the first node, perform a lookup according to a destination address carried in the packet to find a matching local SID forwarding entry, and perform forwarding according to the forwarding behavior of the matching local SID forwarding entry and the VPN SID or VPN label corresponding to the next-hop node.

In an embodiment, the first packet forwarding module is configured to execute at least one of the following: in a case where the forwarding behavior of the matching local SID forwarding entry is swapping the incoming SRv6 SID to the outgoing SRv6 SID, modifying the destination address of the packet into the VPN SID corresponding to the next-hop node, and forwarding the packet to the next-hop node; and in a case where the forwarding behavior of the matching local SID forwarding entry is swapping the incoming SRv6 SID to the outgoing MPLS label, removing an IPv6 packet header of the packet, encapsulating an MPLS label, setting a top label of the packet as the VPN label corresponding to the next-hop node, and forwarding the packet to the next-hop node.

In an embodiment, the device may further include: a second creating module, configured to, in a case where the VPN identity information includes the VPN label, create a corresponding ILM forwarding entry for the assigned VPN label, and set that a label operation of the ILM forwarding entry includes swapping an incoming MPLS label to an outgoing SRv6 SID or MPLS label.

In an embodiment, the second creating module is configured to execute at least one of the following: in a case where the advertisement message, which carries the VPN route information, received by the receiving module only includes the valid VPN SID, setting that the forwarding behavior of the local SID forwarding entry is swapping the incoming SRv6 SID to the outgoing SRv6 SID; in a case where the advertisement message, which carries the VPN route information, received by the receiving module only includes the valid VPN label, setting that the forwarding behavior of the local SID forwarding entry is swapping the incoming SRv6 SID to the outgoing MPLS label; and in a case where the advertisement message, which carries the VPN route information, received by the receiving module includes the valid VPN SID and the valid VPN label, setting the forwarding behavior of the local SID forwarding entry according to a configuration policy.

In an embodiment, the ILM forwarding entry created by the second creating module includes outgoing member forwarding information, and the outgoing member forwarding information includes an ID of a next-hop node and a VPN SID or VPN label corresponding to the next-hop node.

In an embodiment, the device may further include: a second packet forwarding module, configured to receive a packet sent by the second node to the first node, perform a lookup according to a top label of the packet to find a matching ILM forwarding entry, and perform forwarding according to the label operation of the matching ILM forwarding entry and the VPN SID or VPN label corresponding to the next-hop node.

In an embodiment, the second packet forwarding module is configured to execute at least one of the following: in a case where the label operation of the ILM forwarding entry is swapping the incoming MPLS label to the outgoing SRv6 SID, popping out a top label of the packet, encapsulating an IPv6 packet header, modifying a destination address of the packet into the VPN SID corresponding to the next-hop node, and forwarding the packet to the next-hop node; and in a case where the label operation of the ILM forwarding entry is swapping the incoming MPLS label to the outgoing MPLS label, modifying the top label of the packet into the VPN label corresponding to the next-hop node, and forwarding the packet to the next-hop node.

Through the embodiments of the present disclosure, the shortage of the SRv6 technology in terms of VPN cross-domain is overcome, and the VPN packet may be transferred across multiple SRv6 domains as well as across the heterogeneous network composed of the SRv6 domain and the MPLS domain.

Further illustration is given below through several application examples.

Application Example 1

Figure 4:
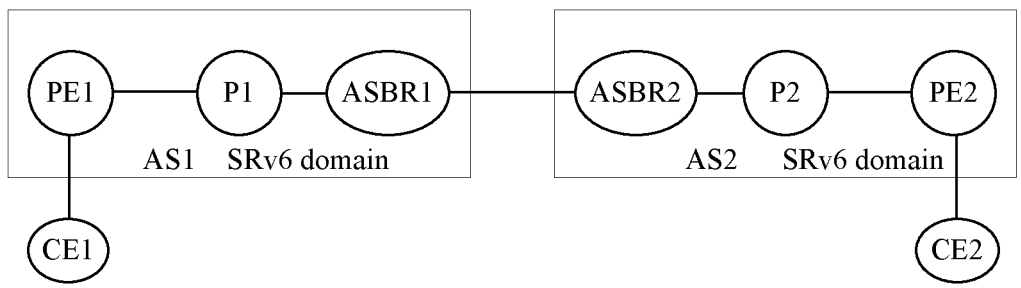
FIG. 4 is a network topology of application example 1.

As shown in FIG. 4, CE1 and CE2 belonging to the same L3VPN client need to be connected across AS1 and AS2, both of which have been upgraded to support the SRv6 capability. The CE1 and the CE2 are both IPv4 clients (the situation in which the CE is an IPv6 client is completely similar). In this application example, it is assumed that PE1 and PE2 assign the VPN SIDs of type END.DX4 to the CE1 and CE2 clients respectively, and advertise the assigned VPN SIDs along with VPNv4 (VPN-IPv4 address family, see RFC4364) route. For example, the PE2 assigns the VPN SID of type END.DX4 for the CE2 client (the VPN SID is an IPv6 address, denoted as sid_dx4_ce2), and the FUNCTION of the local SID forwarding entry maintained for sid_dx4_ce2 on the PE2 is to forward the packet to a corresponding IPv4 link after de-encapsulating the packet to remove the IPv6 packet header. To facilitate the assignment of the above VPN SID on the PE2, a SRv6 SID resource pool for locally assigning the SID may be maintained. The SRv6 SID resource pool is actually an IPv6 prefix, denoted as prefix_srv6_sid_pool_pe2. In order to enable the other nodes in AS2 to perform routing for the above sid_dx4_ce2, the PE2 floods, through the IGP, prefix_srv6_sid_pool_pe2 to the IGP area to which the PE2 belongs.

In the application example, taking accessing the CE2 from the CE1 as an example, a corresponding route advertising and data forwarding process is described, including operations S401 to S410 as follows.

At S401, a MP-IBGP neighbor is established between the PE2 and the ASBR2. The PE2 advertises, through the BGP, the ASBR2 of a certain IPv4 private network route (for example, a loopback route of the CE2, denoted as prefix_ce2) learned from CE2, advertises a corresponding VPNv4 route (denoted as vpnv4_prefix_ce2), and adds (i.e., contains) the sid_dx4_ce2 into the BGP advertisement message.

At S402, a capability of assigning the VPN SID is configured on the ASBR2. After receiving the VPNv4 route (namely the vpnv4_prefix_ce2) advertised by the PE2, the ASBR2 locally assigns a VPN SID (the VPN SID is an IPv6 address, denoted as sid_br_100) to the vpnv4_prefix_ce2. Similar to the PE2, to facilitate the assignment of the above VPN SID on the ASBR2, a SRv6 SID resource pool for locally assigning the SID may be maintained, which is denoted as prefix_srv6_sid_pool_asbr2 and flooded, through the IGP, to the IGP area to which the ASBR2 belongs.

The FUNCTION of the local SID forwarding entry maintained by the ASBR2 for the sid_br_100 is swapping an incoming SRv6 SID to an outgoing SRv6 SID or MPLS label. The entry includes only a BGP next hop PE2 and its related sid_dx4_ce2.

In addition, the ASBR2 will also learn prefix_srv6_sid_pool_PE2 through IGP flooding.

At S403, a MP-EBGP neighbor is established between the ASBR2 and the ASBR1. The ASBR2 continues to advertise the ASBR1 of the VPNv4 route (namely the vpnv4_prefix_ce2) that is advertised by the PE2 to the ASBR2, adds the sid_br_100 into the BGP advertisement message, and modifies a BGP next hop into the ASBR2 (a MP-EBGP session between the ASBR1 and the ASBR2 is generally established based on an interface IP address of a direct connection link between the ASBR1 and the ASBR2, so the BGP next hop here is actually the interface IP address of the link for connecting the ASBR2 to the ASBR1, which is a direct connection IP address from the perspective of the ASBR1).

At S404, a capability of assigning the VPN SID is configured on the ASBR1. After receiving the VPNv4 route (namely the vpnv4_prefix_ce2) advertised by the ASBR2, the ASBR1 locally assigns a VPN SID (the VPN SID is an IPv6 address, denoted as sid_br_200) to the vpnv4_prefix_ce2. Similar to the ASBR2, to facilitate the assignment of the above VPN SID on the ASBR1, a SRv6 SID resource pool for locally assigning the SID may be maintained, which is denoted as prefix_srv6_sid_pool_asbr1 and flooded, through the IGP, to the IGP area to which the ASBR1 belongs.

The FUNCTION of the local SID forwarding entry maintained by the ASBR1 for the sid_br_200 is swapping an incoming SRv6 SID to an outgoing SRv6 SID or MPLS label. The entry includes only a BGP next hop ASBR2 (as described above, this is a direct connection IP address) and its related sid_br_100.

At S405, the MP-IBGP neighbor is established between the ASBR1 and the PE1. The ASBR1 continues to advertise the PE1 of the VPNv4 route (namely vpnv4_prefix_ce2) that is advertised by the ASBR2 to the ASBR1, adds the sid_br_200 into the BGP advertisement message, and modifies the BGP next hop into the ASBR1.

At S406, after receiving the VPNv4 route (namely vpnv4_prefix_ce2) that is advertised by the ASBR1, the PE1 imports the VPNv4 route into a local corresponding VRF routing table according to a BGP route target policy, and creates a private network routing table entry prefix_ce2, which includes only a BGP next hop ASBR1 and its related sid_br_200.

In addition, the PE1 will also learn prefix_srv6_sid_pool_asbr1 through IGP flooding.

At S407, when an IPv4 packet that the CE1 accesses the CE2 arrives at the PE1, a lookup operation is performed in the corresponding VRF routing table according to the destination IP address of the packet to find the matching private network routing table entry prefix_ce2, encapsulation is performed to add the outer IPv6 packet header into the packet, and the destination address in the IPv6 packet header may be directly set as sid_br_200. Then, a lookup operation is performed in the public network routing table according to the sid_br_200 to find the matching prefix_srv6_sid_pool_asbr1, and the packet will be forwarded to the ASBR1 along an IGP shortest path (or a Traffic Engineering (TE) route).

At S408, when the IPv6 packet arrives at the ASBR1, a lookup operation is performed in the public network routing table according to the destination IP address (sid_br_200) of the packet to find the matching local SID forwarding entry. Because the FUNCTION of the local SID forwarding entry is swapping an incoming SRv6 SID to an outgoing SRv6 SID or MPLS label, and the entry includes only a BGP next hop ASBR2 (as described above, this is a direct connection IP address) and its related sid_br_100. After the destination IP address of the IPv6 packet is modified to sid_br_100, the packet is directly sent to the direct connection next hop ASBR2 (here, because the BGP next hop address is the direct connection IP address, there is no need to use the sid_br_100 to look up in the routing table for forwarding information).

At S409, when the IPv6 packet arrives at the ASBR2, a lookup operation is performed in the public network routing table according to the destination IP address (sid_br_100) of the packet to find the matching local SID forwarding entry. Because the FUNCTION of the local SID forwarding entry is swapping an incoming SRv6 SID to an outgoing SRv6 SID or MPLS label, and the entry includes only a BGP next hop PE2 and its related sid_dx4_ce2, after the destination IP address of the IPv6 packet is modified to sid_dx4_ce2, a lookup operation is performed in the public network routing table according to the sid_dx4_ce2 to find the matching prefix_srv6_sid_pool_pe2, and the packet will be forwarded along the IGP shortest route (or the TE route).

At S410, when the IPv6 packet arrives at the PE2, a lookup operation is performed in the public network routing table according to the destination IP address (sid_dx4_ce2) of the packet to find the matching local SID forwarding entry. Because the FUNCTION of the local SID forwarding entry is to forward the packet to the corresponding IPv4 link (namely END.DX4) after de-encapsulating the packet to remove the IPv6 packet header, the IPv6 packet header is removed and the packet is forwarded to the CE2.

The route advertisement and data forwarding process involved in accessing the CE1 from the CE2 is similar, so the detailed process will not be repeated.

Application Example 2

Figure 5:
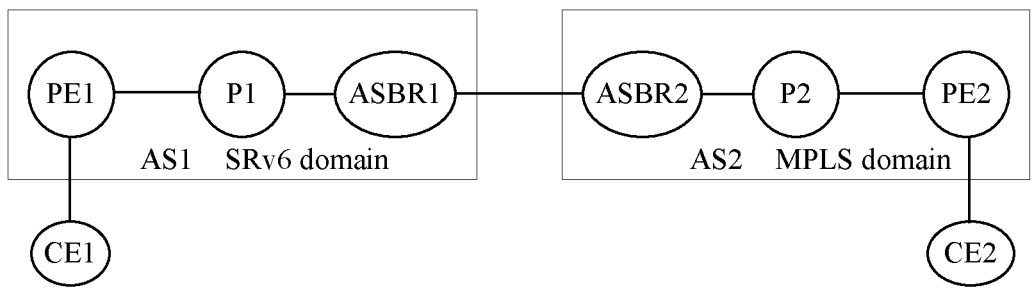
FIG. 5 is a network topology of application examples 2 and 3.

This application example is basically the same as the application example 1, as shown in FIG. 5, except that the AS1 has been upgraded to support the SRv6 capability, while the AS2 only supports the MPLS capability. The PE1 assigns the VPN SID of type END.DX4 (denoted as sid_dx4_ce1) for the CE1 client and maintains the corresponding local SID forwarding entry. The PE1 also maintains the SRv6 SID resource pool (denoted as prefix_srv6_sid_pool_pe1) and floods, through the IGP, the SRv6 SID resource pool to the IGP area to which the PE1 belongs.

In the application example, taking accessing CE2 from CE1 as an example, the corresponding route advertisement and data forwarding process is described, including operations S501 to S510 as follows.

At S501, a MP-IBGP neighbor is established between the PE2 and the ASBR2. The PE2 advertises, through the BGP, the ASBR2 of a certain IPv4 private network route (for example, the loopback route of the CE2, denoted as prefix_ce2) learned from the CE2, advertises the corresponding VPNv4 route (denoted as vpnv4_prefix_ce2), and adds the VPN label (denoted as label_ce2) into the BGP advertisement message. The PE2 creates the corresponding ILM entry for the label_ce2, and the label operation specified in the entry is to forward the packet to the CE2 after removing the label.

At S502, after the ASBR2 receives the VPNv4 route (namely the vpnv4_prefix_ce2) advertised by the PE2, a VPN label (denoted as label_br_100) is locally assigned to the vpnv4_prefix_ce2, and the corresponding ILM entry is created for the label_br_100. The entry includes only a BGP next hop PE2 and its related label_ce2.

At S503, a MP-EBGP neighbor is established between the ASBR2 and the ASBR1. The ASBR2 continues to advertise the ASBR1 of the VPNv4 route (namely the vpnv4_prefix_ce2) that is advertised by the PE2 to the ASBR2, adds the label_br_100 into the BGP advertisement message, and modifies the BGP next hop into the ASBR2 (the MP-EBGP session between the ASBR1 and the ASBR2 is generally established based on the interface IP address of the direct link between the ASBR1 and the ASBR2, so the BGP next hop here is actually the interface IP address of the link for connecting the ASBR2 to the ASBR1, which is a direct connection IP address from the perspective of the ASBR1).

At S504, a capability of assigning the VPN SID is configured on the ASBR1. After receiving the VPNv4 route (namely the vpnv4_prefix_ce2) advertised by the ASBR2, the ASBR1 locally assigns a VPN SID (the VPN SID is an IPv6 address, denoted as sid_br_200) to the vpnv4_prefix_ce2. To facilitate the assignment of the above VPN SID on the ASBR1, a SRv6 SID resource pool for locally assigning the SID may be maintained, which is denoted as prefix_srv6_sid_pool_asbr1 and flooded, through the IGP, to the IGP area to which the ASBR1 belongs.

The FUNCTION of the local SID forwarding entry maintained by the ASBR1 for the sid_br_200 is swapping an incoming SRv6 SID to an outgoing SRv6 SID or MPLS label. The entry includes only a BGP next hop ASBR2 (as described above, this is a direct connection IP address) and its related sid_br_100.

At S505, the MP-IBGP neighbor is established between the ASBR1 and the PE1. The ASBR1 continues to advertise the PE1 of the VPNv4 route (namely vpnv4_prefix_ce2) that is advertised by the ASBR2 to the ASBR1, adds the sid_br_200 into the BGP advertisement message, and modifies the BGP next hop into the ASBR1.

At S506, after receiving the VPNv4 route (namely vpnv4_prefix_ce2) that is advertised by the ASBR1, the PE1 imports the VPNv4 route into the local corresponding VRF routing table according to the BGP route target policy, and creates the private network routing table entry prefix_ce2, which includes only a BGP next hop ASBR1 and its related sid_br_200.

In addition, the PE1 will also learn prefix_srv6_sid_pool_asbr1 through IGP flooding.

At S507, when the IPv4 packet that the CE1 accesses the CE2 arrives at the PE1, a lookup operation is performed in the corresponding VRF routing table according to the destination IP address of the packet to find the matching private network routing table entry prefix_ce2, encapsulation is performed to add the outer IPv6 packet header into the packet, and the destination address in the IPv6 packet header may be directly set as sid_br_200. Then, a lookup operation is performed in the public network routing table according to the sid_br_200 to find the prefix_srv6_sid_pool_asbr1, and the packet will be forwarded to the ASBR1 along the IGP shortest path (or the TE route).

At S508, when the IPv6 packet arrives at the ASBR1, a lookup operation is performed in the public network routing table according to the destination IP address (sid_br_200) of the packet to find the matching local SID forwarding entry. Because the FUNCTION of the local SID forwarding entry is swapping an incoming SRv6 SID to an outgoing SRv6 SID or MPLS label, and the entry includes only a BGP next hop ASBR2 (as described above, this is a direct connection IP address) and its related sid_br_100. After the IPv6 packet header is removed and the MPLS label is added, the packet is modified into a MPLS packet. The top label of the packet is set as label_br_100, and then the packet is sent directly to the direct connection next hop ASBR2 (it is to be noted that because the BGP next hop address is the direct connection IP address here, there is no need to iterate to look up for the forwarding information).

At S509, after the MPLS packet arrives at the ASBR2, the ASBR2 looks up for the ILM entry according to the top label label_br_100 of the packet, and swaps the label to label_ce2, and then the packet passes through a public network tunnel to the PE2.

At S510, after the packet arrives at the PE2, the public network tunnel terminates, the ILM entry found according to the top label label_ce2 of the packet, and the packet is forwarded to the CE2 after the label is popped out.

Application Example 3

With reference to FIG. 5, the route advertisement and data forwarding process involved in accessing the CE1 from the CE2 is described, including operations S601 to S609 as follows.

At S601, a MP-IBGP neighbor is established between the PE1 and the ASBR1. The PE1 advertises, through the BGP, the ASBR1 of a certain IPv4 private network route (for example, the loopback route of the CE1, denoted as prefix_ce1) learned from CE1, advertises the corresponding VPNv4 route (denoted as vpnv4_prefix_ce1), and adds the sid_dx4_ce1 into the BGP advertisement message.

At S602, a capability of assigning the VPN SID is configured on the ASBR1. After receiving the VPNv4 route (namely the vpnv4_prefix_ce1) advertised by the PE1, the ASBR1 locally assigns a VPN SID to the vpnv4_prefix_ce1. In addition, the ASBR1 also has the MPLS capability, and the ASBR1 may also locally assign a VPN label (denoted as label_br_300) to the vpnv4_prefix_ce1.

The label operation of the ILM entry maintained by the ASBR1 for the label_br_300 is swapping the incoming MPLS label to the outgoing SRv6 SID or MPLS label. The entry includes only a BGP next hop PE1 and its related sid_dx4_ce1.

In addition, the ASBR1 will also learn prefix_srv6_sid_pool_PE1 through IGP flooding.

At S603, a MP-EBGP neighbor is established between the ASBR1 and the ASBR2. The ASBR1 continues to advertise the ASBR2 of the VPNv4 route (namely vpnv4_prefix_ce1) that is advertised by the PE1 to the ASBR1, adds the label_br_300 into the BGP advertisement message, and modifies the BGP next hop into the ASBR1

(the MP-EBGP session between the ASBR1 and the ASBR2 is generally established based on the interface IP address of the direct connection link between them, so the BGP next hop here is actually the interface IP address of the link for connecting the ASBR1 to the ASBR2, which is a direct connection IP address from the perspective of the ASBR2).

At S604, after receiving the VPNv4 route (namely the vpnv4_prefix_ce1) advertised by the ASBR1, the ASBR2 locally assigns a VPN label (denoted as label_br_400) to the vpnv4_prefix_ce2, and maintains the corresponding ILM entry. The ASBR2 continues to advertise the route to the PE2, adds the sid_br_400 into the BGP advertisement message, and modifies the BGP next hop to the ASBR2.

At S605, after receiving the VPNv4 route (namely vpnv4_prefix_ce1) that is advertised by the ASBR1, the PE2 imports the VPNv4 route into the local corresponding VRF routing table according to the BGP route target policy, and creates the private network routing table entry prefix_ce1, which includes only a BGP next hop ASBR2 and its related sid_br_400.

At S606, when the IPv4 packet that the CE2 accesses the CE1 arrives at the PE2, the PE2 looks up in the corresponding VRF routing table according to the destination IP address of the packet to find a matching private network routing table entry prefix_ce1, and encapsulates the VPN label (label_br_400). The packet then passes through the public network tunnel to the ASBR2.

At S607, when the packet arrives at the ASBR2, the public network tunnel terminates, the ILM entry found according to the top label label_br_400 of the packet, and the label is swapped to the label_br_300 and then the packet is forwarded to the ASBR1.

At S608, when the packet arrives at the ASBR1, the ILM entry is found according to the top label label_br_300 of the packet. The label operation of the ILM entry is swapping the incoming MPLS label to the outgoing SRv6 SID or MPLS label. The entry includes only a BGP next hop PE1 and its related sid_dx4_ce1. The top label label_br_300 of the packet is popped out, and the packet is re-encapsulated into an IPv6 packet by adding the IPv6 packet header. The destination address of the packet is sid_dx4_ce1. A lookup operation is performed in the public network routing table according to the sid_dx4_ce1 to find the matching prefix_srv6_sid_pool_pe1. The packet will be forwarded to the PE1 along the IGP shortest route (or the TE route).

At S609, when the IPv6 packet arrives at the PE1, a lookup operation is performed in the public network routing table according to the destination IP address (sid_dx4_ce1) of the packet to find the matching local SID forwarding entry. Because the FUNCTION of the local SID forwarding entry is forwarding the packet to the corresponding IPv4 link (namely END.DX4) after de-encapsulating the packet to remove the IPv6 packet header, the IPv6 packet header is removed and the packet is forwarded to the CE1.

Application Example 4

Figure 6:
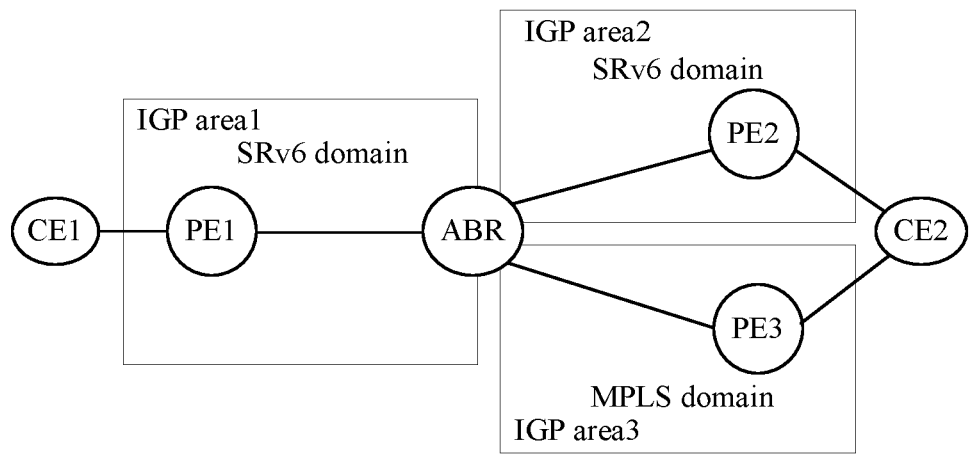
FIG. 6 is a network topology of application example 4.

As shown in FIG. 6, the CE1 and the CE2 belonging to the same L3VPN client need to cross IGP area 1, IGP area 2, and IGP area 3 which are connected. Both the IGP are 1 and the IGP area 2 have been upgraded to support the SRv6 capability, while the IGP area 3 only supports the MPLS capability. Both the CE1 and the CE2 are the IPv4 client, and the CE2 belongs to both the PE2 and the PE3. In the application example, it is assumed that the PE1 and the PE2 assign the VPN SIDs of type END.DX4 to the CE1 and CE2 clients respectively, and advertise the assigned VPN SIDs along with the VPNv4 route. Similar to the above application examples, the PE1 assigns the VPN SID of type END.DX4 (denoted as sid_dx4_ce1) to the CE1 client, and the maintained SRv6 SID resource pool is denoted as prefix_srv6_sid_pool_pe1 and is flooded in the IGP area 1. The PE2 assigns the VPN SID of type END.DX4 (denoted as sid_dx4_ce2) to the CE2 client, and the maintained SRv6 SID resource pool is denoted as prefix_srv6_sid_pool_pe2 and is flooded in the IGP area 2.

The processing flow of this application example is similar to that of the above application examples, except that the local SID forwarding entry maintained for the VPN SID on the ABR node will include ECMP (or FRR) forwarding information. The processing flow includes operations S701 to S708 which are described briefly below.

At S701, the PE2 advertises the ABR of the vpnv4_prefix_ce2 through the MP-IBGP, and adds the sid_dx4_ce2 into the BGP advertisement message. The PE2 maintains the corresponding local SID forwarding entry for the sid_dx4_ce2.

At S702, the PE3 advertises the ABR of the vpnv4_prefix_ce2 through the MP-IBGP, and adds the label_ce2 into the BGP advertisement message. The PE3 maintains the corresponding ILM entry for the label_ce2.

At S703, a capability of assigning the VPN SID is configured on the ABR. After receiving the VPNv4 route (namely the vpnv4_prefix_ce2) advertised by the PE2 or PE3, the ABR locally assigns a VPN SID (denoted as sid_br_100) to the vpnv4_prefix_ce2. The SRv6 SID resource pool maintained by the ABR is denoted as prefix_srv6_sid_pool_abr and is flooded, through the IGP, to the IGP area to which the ABR belongs.

The FUNCTION of the local SID forwarding entry maintained by the ABR for the sid_br_100 is swapping an incoming SRv6 SID to an outgoing SRv6 SID or MPLS label. The entry includes two pieces of outgoing member forwarding information, one of which is the BGP next hop PE2 and its related sid_dx4_ce2, and the other is the BGP next hop PE3 and its related label_ce2. The two pieces of outgoing member forwarding information may form ECMP or FRR.

In addition, the ABR will also learn the prefix_srv6_sid_pool_PE2 through IGP flooding.

The ABR continues to advertise the vpnv4_prefix_ce2 to the PE1 through the MP-IBGP, and adds the sid_br_100 into the BGP advertisement message.

At S704, after receiving the VPNv4 route (namely the vpnv4_prefix_ce2) advertised by the ABR, the PE1 creates the private network routing table entry prefix_ce2. The table entry includes only a BGP next hop ABR and its related sid_br_100.

In addition, the PE1 will also learn the prefix_srv6_sid_pool_abr through IGP flooding.

At S705, when the IPv4 packet that the CE1 accesses the CE2 arrives at the PE1, encapsulation is performed to add the outer IPv6 packet header into the packet. The destination address in the IPv6 packet header may be directly set as sid_br_100, and the packet will be forwarded to the ABR along the IGP shortest route (or the TE route).

At S706, when the IPv6 packet arrives at the ABR, a lookup operation is performed in the public network routing table according to the destination IP address (sid_br_100) of the packet to find the matching local SID forwarding entry. Because the FUNCTION of the local SID forwarding entry is swapping an incoming SRv6 SID to an outgoing SRv6 SID or MPLS label, and the entry includes two pieces of outgoing member forwarding information, when the packet is forwarded to the first member, the destination IP address of the IPv6 packet is modified into the sid_dx4_ce2, the routing table is looked up and the packet is forwarded to the PE2 along the IGP shortest route (or the TE route); and when the packet is forwarded to the second member, the IPv6 packet header is removed and an MPLS label is added into the packet, and the packet passes through the public network tunnel to the PE3 after the label label_ce2 is pushed in.

At S707, after the IPv6 packet arrives at the PE2, the matching local SID forwarding entry is found, and the packet is forwarded to the CE2 after being de-encapsulated to remove the IPv6 packet header.

At S708, after the MPLS packet arrives at the PE3, the ILM entry related to the label_ce2 is found, and the packet is forwarded to the CE2 after the top label label_ce2 is popped out.

Application Example 5

Figure 7:
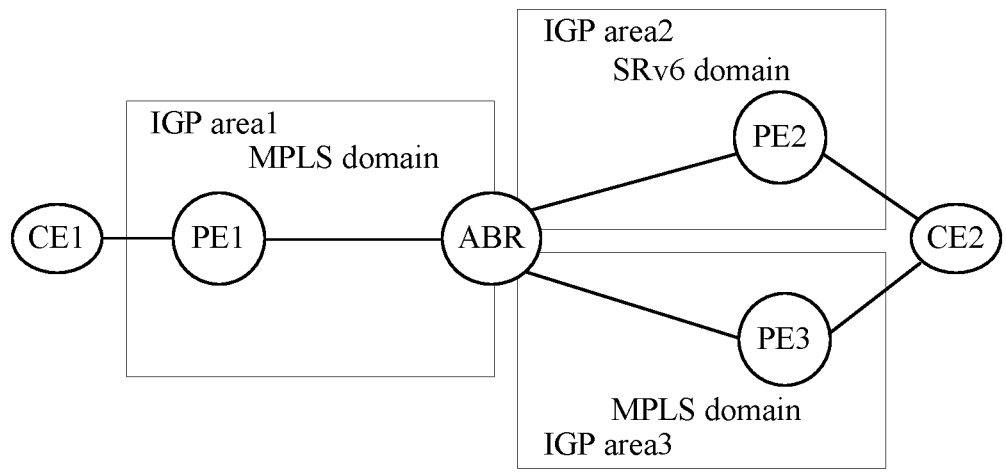
FIG. 7 is a network topology of application example 5.

This application example is basically the same as the application example 4. As shown in FIG. 7, only the IGP area 2 has been upgraded to support the SRv6 capability, while the IGP area 1 and the IGP area 3 only support the MPLS capability. This application example differs from other application examples in that the ILM entry maintained on the ABR node includes the ECMP (or FRR) forwarding information. The processing flow includes operations S801 to S808 which are described briefly below.

At S801, the PE2 advertises the ABR of the vpnv4_prefix_ce2 through the MP-IBGP, and adds the sid_dx4_ce2 into the BGP advertisement message. The PE2 maintains the corresponding local SID forwarding entry for the sid_dx4_ce2.

At S802, the PE3 advertises the ABR of the vpnv4_prefix_ce2 through the MP-IBGP, and adds the label_ce2 into the BGP advertisement message. The PE3 maintains the corresponding ILM entry for the label_ce2.

At S803, a capability of assigning the VPN SID is configured on the ABR. After receiving the VPNv4 route (namely the vpnv4_prefix_ce2) advertised by the PE2 or PE3, the ABR locally assigns a VPN SID to the vpnv4_prefix_ce2. In addition, the ABR also has the MPLS capability, and may also locally assign a VPN label (denoted as label_br_100) to the vpnv4_prefix_ce2.

The label operation of the ILM entry maintained by the ABR for the label_br_100 is swapping the incoming MPLS label to the outgoing SRv6 SID or MPLS label. The entry includes two pieces of outgoing member forwarding information, one of which is the BGP next hop PE2 and its related sid_dx4_ce2, and the other is the BGP next hop PE3 and its related label_ce2. The two pieces of outgoing member forwarding information may form ECMP or FRR.

In addition, the ABR will also learn the prefix_srv6_sid_pool_PE2 through IGP flooding.

The ABR continues to advertise the vpnv4_prefix_ce2 to the PE1 through the MP-IBGP, and adds the label_br_100 into the BGP advertisement message.

At S804, after receiving the VPNv4 route (namely the vpnv4_prefix_ce2) advertised by the ABR, the PE1 creates the private network routing table entry prefix_ce2. The table entry includes only a BGP next hop ABR and its related label_br_100.

At S805, when the IPv4 packet that the CE1 accesses the CE2 arrives at the PE1, a MPLS label stack is encapsulated, a bottom label is label_br_100, and the packet passes through the public network tunnel to the ABR.

At S806, when the packet arrives at the ABR, the public network tunnel terminates, the matching ILM entry is found according to the top label label_br_100 of the packet. Because the label operation of the ILM entry is swapping the incoming MPLS label to the outgoing SRv6 SID or MPLS label, and the entry includes two pieces of outgoing member forwarding information, when the packet is forwarded to the first member, the label label_br_100 is popped out and the packet is then re-encapsulated to add the IPv6 packet header, the destination IP address of the IPv6 packet is set as sid_dx4_ce2, and then the routing table is looked up to forward the packet to the PE2 along the IGP shortest route (or the TE route); when the packet is forwarded to the second member, the label label_br_100 is swapped to the label label_ce2, and then the packet passes through the public network tunnel to the PE3.

At S807, after the IPv6 packet arrives at the PE2, the matching local SID forwarding entry is found, and the packet is forwarded to the CE2 after being de-encapsulated to remove the IPv6 packet header.

At S808, after the MPLS packet arrives at the PE3, the ILM entry related to the label_ce2 is found, and the packet is forwarded to the CE2 after the top label label_ce2 is popped out.

Application Example 6

This application example is cross-domain for EVPN, which is completely similar to the aforementioned cross-domain application example of L3VPN, except that the types of route advertised through the BGP are different, while the processing on the ASBR (or ABR) node is completely similar.

For example, FIG. 4 shows a point-to-point cross domain. The CE1 and the CE2 establish a point-to-point connection through the PE1 and the PE2. The ASBR2 may receive from the PE2 an Ethernet Auto-discovery Route (Type-1) advertisement, which includes the valid SRv6 VPN SID (for example, FUNCTION is END.DX2, denoted as sid_dx2_pe2). The ASBR2 is configured to have the capability of assigning the VPN SID, and the ASBR2 can reassign a new VPN SID (denoted as sid_dx2_asbr2) for the above VPN route. The ASBR2 continues to advertise the ASBR1 of the above VPN route and modifies the next hop into the ASBR2, and the VPN route includes the new VPN SID (sid_dx2_asbr2) assigned by the ASBR2. Similarly, the ASBR1 is also configured to have the capability of assigning the VPN SID. A new VPN SID (denoted as sid_dx2_asbr1) is assigned for the VPN route received from the ASBR2. The ASBR1 continues to advertise the PE1 of the above VPN route and modifies the next hop into the ASBR1, and the VPN route includes the new VPN SID (sid_dx2_asbr1) assigned by the ASBR1. Both the FUNCTIONs of the local SID forwarding entries created for the newly assigned VPN SIDs on the ASBR1 and the ASBR2 are swapping the incoming SRv6 SID to the outgoing SRv6 SID or MPLS label. When the packet is forwarded from the CE1 to the CE2, the ASBR1 will receive the IPv6 packet, the destination IP of which is the sid_dx2_asbr1, and the matching local SID forwarding entry will be found. The ASBR1 swaps the destination IP of the IPv6 packet to the sid_dx2_asbr2, and the packet continues to be forwarded to the ASBR2. Similarly, after receiving the packet, the ASBR2 will swap the destination IP of the packet to the sid_dx2_pe2, and continues to forward the packet to the PE2 along the shortest route (or the TE route). The details of the process will not be repeated.

For example, FIG. 6 shows a point-to-multipoint cross-domain. The ABR may receive from the PE2 a MAC/IP Advertisement Route (Type-2) advertisement, which includes the valid SRv6 VPN SID. In addition, the ABR may also receive from the PE3 the MAC/IP Advertisement Route (Type-2) advertisement with the same Network Layer Reachability Information (NLRI) key value, which includes the valid MPLS label. The ABR may locally assign the corresponding VPN SID or VPN label, and create the corresponding local SID forwarding entry or ILM entry, which includes two pieces of outgoing member forwarding information forming ECMP (or FRR). In this case, the FUNCTION of the corresponding local SID forwarding entry is swapping an incoming SRv6 SID to an outgoing SRv6 SID or MPLS label, and correspondingly, the label operation of the ILM is swapping the incoming MPLS label to the outgoing SRv6 SID or MPLS label. The details of the process will not be repeated.

In addition, the EVPN also defines an IP prefix route (Type-5) to support L3VPN services. In this case, the cross-domain option in the embodiments of the present disclosure may also be used. The specific process will not be repeated herein.

Application Example 7

The traditional L2VPN that establishes Pseudo-Wire (PW), for example, RFC4761 defines the BGP Virtual Private Lan Service (VPLS) NLRI route type, which is used to advertise a PW-related label. Although the current draft-dawra-idr-srv6-vpn-02 does not describe how to extend RFC4761 to support carrying the SRV6 SID in the BGP VPLS NLRI, such an extension is entirely feasible. When the BGP VPLS NLRI can also support carrying SRv6 SID information, then the cross-domain option described in the embodiments of the present disclosure may also be applied, which is completely similar to the above application examples except that the advertised route types are different. The specific process will not be repeated herein.

Figure 8:
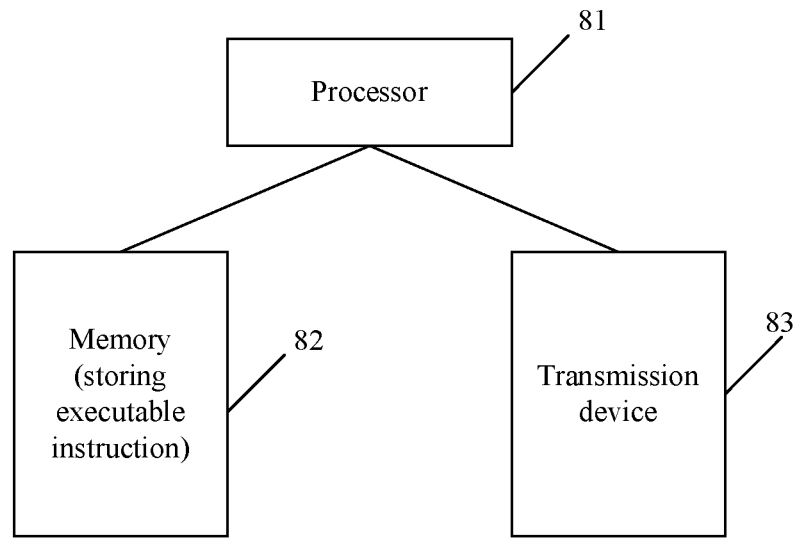
FIG. 8 is a structure diagram of a border node according to an embodiment of the present disclosure.

As shown in FIG. 8, the embodiments of the present disclosure also provide a border node, which supports the SRv6 capability and includes: a processor 81; a memory 82, configured to store an instruction executable for the processor; and a transmission device 83 configured to send and receive information for communication under control of the processor. The processor 81 is configured to execute the following operations of controlling the transmission device 83 to receive an advertisement message which carries VPN route information and is sent by a first node to a second node, wherein the first node and the second node belong to different domains; and assigning the VPN identity information to a VPN route corresponding to the VPN route information, adding the VPN identity information into the advertisement message, and sending the advertisement message to the second node, wherein the VPN identity information includes at least one of: a VPN SID and a VPN label.

The embodiments of the present disclosure also provide a computer-readable storage medium, which stores a computer-executable instruction. The computer-executable instruction is used to perform any method described in the embodiments of the present disclosure.

Those having ordinary skill in the art may understand that all or some of the operations in the above method, the system, the functional modules/units in the device may be implemented as software, firmware, hardware and a proper combination of software, firmware and hardware. In an implementation of hardware, the division among the functional modules/units mentioned in the above description does not necessarily correspond to the division of physical units. For example, a physical component may have multiple functions, or a function or operation may be performed by several physical components in coordination. Some or all of the components may be implemented as software performed by a processor (for example, a digital signal processor or a microprocessor), or implemented as hardware, or implemented as an integrated circuit (for example, an application-specific integrated circuit). Such software may be distributed on computer readable media. The computer readable media may include computer storage media (or non-temporary media) and communication media (or temporary media). As those having ordinary skill in the art know, the term computer storage media include volatile (transitory) and non-volatile (non-transitory) media, and removable and un-removable media which are implemented in any method or technology for storing information (such as a computer readable instruction, a data structure, a program module or other data). The computer storage media include, but is not limited to be, an RAM, an ROM, an EEPROM, a flash memory or other memory technologies, a CD-ROM, a Digital Video Disk (DVD) or other optical storage, a cartridge, a tape, a disk storage or other magnetic storage devices, or any other media which may be used for storing information and may be accessed by a computer. Moreover, as those having ordinary skill in the art know, the communication media generally include the computer readable instruction, the data structure, the program module or other data contained in carriers or a modulation data signal transmitted according to other transmission mechanisms, and may include any information delivery media.

It is understandable that the above embodiments are only exemplary embodiments used to illustrate the principles of the present disclosure. The present disclosure is not limited to the exemplary embodiments described herein. For those having ordinary skill in the art, various variations and improvements may be made without departing from the substance of the present disclosure. These variations and improvements are also considered to be within the scope defined by the appended set of claims of the present disclosure.

What is claimed is:

1. A method for implementing Virtual Private Network (VPN) cross-domain, comprising:
   receiving, by a border node, an advertisement message which carries VPN route information and is sent by a first node to a second node, wherein the border node supports Internet Protocol Version 6 Segment Routing (SRv6) capability, and the first node and the second node belong to different domains; and
   assigning, by the border node, VPN identity information to a VPN route corresponding to the VPN route information, adding the VPN identity information into the advertisement message, and sending the advertisement message to the second node, wherein the VPN identity information comprises at least one of: a VPN Segment ID (SID) and a VPN label;
   wherein in a case where the VPN identity information comprises the VPN SID, after assigning, by the border node, the VPN identity information to the VPN route corresponding to the VPN route information, the method further comprises:
   creating, by the border node, a corresponding local SID forwarding entry for the assigned VPN SID, and setting that a forwarding behavior of the local SID forwarding entry comprises swapping an incoming SRv6 SID to an outgoing SRv6 SID or Multiprotocol Label Switching (MPLS) label.

2. The method according to claim 1, wherein before receiving, by the border node, the advertisement message which carries the VPN route information and is sent by the first node to the second node, the method further comprises:
configuring the border node to have a capability of assigning the VPN SID.

3. The method according to claim 1, wherein assigning, by the border node, the VPN identity information to the VPN route corresponding to the VPN route information comprises:
assigning, by the border node, the VPN identity information according to a capability of the second node.

4. The method according to claim 3, wherein assigning, by the border node, the VPN identity information according to the capability of the second node comprises:
in a case where the second node only supports the SRv6 capability, assigning, by the border node, one of the following as the VPN identity information:
a valid VPN SID; and
a valid VPN SID and an invalid VPN label.

5. The method according to claim 3, wherein assigning, by the border node, the VPN identity information according to the capability of the second node comprises:
in a case where the second node supports both the SRv6 capability and a Multiprotocol Label Switching (MPLS) capability, assigning, by the border node, one of the following as the VPN identity information according to a configuration policy:
a valid VPN SID and a valid VPN label;
a valid VPN SID and an invalid VPN label;
a valid VPN label and an invalid VPN SID;
a valid VPN SID; and
a valid VPN label.

6. The method according to claim 3, wherein assigning, by the border node, the VPN identity information according to the capability of the second node comprises:
in a case where the second node only supports a Multiprotocol Label Switching (MPLS) capability, assigning, by the border node, one of the following as the VPN identity information:
a valid VPN label; and
a valid VPN label and an invalid VPN SID.

7. The method according to claim 1, wherein by the border node, creating the corresponding local SID forwarding entry for the assigned VPN SID, and setting that the forwarding behavior of the local SID forwarding entry comprises swapping the incoming SRv6 SID to the outgoing SRv6 SID or MPLS label comprises at least one of the following:
in a case where the advertisement message, which carries the VPN route information, received by the border node comprises only a valid VPN SID, setting, by the border node, that the forwarding behavior of the local SID forwarding entry is swapping the incoming SRv6 SID to the outgoing SRv6 SID;
in a case where the advertisement message, which carries the VPN route information, received by the border node comprises only a valid VPN label, setting, by the border node, that the forwarding behavior of the local SID forwarding entry is swapping the incoming SRv6 SID to the outgoing MPLS label; and
in a case where the advertisement message, which carries the VPN route information, received by the border node comprises a valid VPN SID and a valid VPN label, setting, by the border node, the forwarding behavior of the local SID forwarding entry according to a configuration policy.

8. The method according to claim 1, wherein after assigning, by the border node, the VPN identity information to the VPN route corresponding to the VPN route information, the method further comprises:
flooding, by the border node through an Interior Gateway Protocol (IGP), route information comprising the VPN SID to an IGP area to which the border node belongs.

9. The method according to claim 1, wherein
the local SID forwarding entry created by the border node comprises outgoing member forwarding information, and the outgoing member forwarding information comprises an ID of a next-hop node, and a VPN SID or VPN label corresponding to the next-hop node.

10. The method according to claim 9, wherein
the local SID forwarding entry created by the border node comprises Equal-Cost Multipath Routing (ECMP) forwarding information or Fast Reroute (FRR) forwarding information generated according to the outgoing member forwarding information.

11. The method according to claim 9, wherein after by the border node, assigning the VPN identity information to the VPN route corresponding to the VPN route information, adding the VPN identity information into the advertisement message, and sending the advertisement message to the second node, the method further comprises:
receiving, by the border node, a packet sent by the second node to the first node, performing a lookup according to a destination address carried in the packet to find a matching local SID forwarding entry, and performing forwarding according to the forwarding behavior of the matching local SID forwarding entry and the VPN SID or VPN label corresponding to the next-hop node.

12. The method according to claim 11, wherein performing forwarding according to the forwarding behavior of the matching local SID forwarding entry and the VPN SID or VPN label corresponding to the next-hop node comprises at least one of the following:
in a case where the forwarding behavior of the matching local SID forwarding entry is swapping the incoming SRv6 SID to the outgoing SRv6 SID, by the border node, modifying the destination address of the packet into the VPN SID corresponding to the next-hop node, and forwarding the packet to the next-hop node;
in a case where the forwarding behavior of the matching local SID forwarding entry is swapping the incoming SRv6 SID to the outgoing MPLS label, by the border node, removing an IPv6 packet header of the packet, encapsulating an MPLS label, setting a top label of the packet as the VPN label corresponding to the next-hop node, and forwarding the packet to the next-hop node.

13. The method according to claim 1, wherein in a case where the VPN identity information comprises the VPN label, after assigning, by the border node, the VPN identity information to the VPN route corresponding to the VPN route information, the method further comprises:
creating by the border node, a corresponding In-label Mapping (ILM) forwarding entry for the assigned VPN label, and setting that a label operation of the ILM forwarding entry comprises swapping an incoming Multiprotocol Label Switching (MPLS) label to an outgoing SRv6 SID or MPLS label.

14. The method according to claim 13, wherein by the border node, creating the corresponding ILM forwarding entry for the assigned VPN label, and setting that the label operation of the ILM forwarding entry comprises swapping the incoming MPLS label to the outgoing SRv6 SID or MPLS label comprises at least one of the following:

in a case where the advertisement message, which carries the VPN route information, received by the border node comprises only a valid VPN SID, setting, by the border node, that the label operation of the ILM forwarding entry is swapping the incoming MPLS label to the outgoing SRv6 SID;

in a case where the advertisement message, which carries the VPN route information, received by the border node comprises only a valid VPN label, setting, by the border node, that the label operation of the ILM forwarding entry is swapping the incoming MPLS label to the outgoing MPLS label;

in a case where the advertisement message, which carries the VPN route information, received by the border node comprises a valid VPN SID and a valid VPN label, setting, by the border node, the label operation of the ILM forwarding entry according to a configuration policy.

15. The method according to claim 13, wherein
the ILM forwarding entry created by the border node comprises outgoing member forwarding information, and the outgoing member forwarding information comprises an ID of a next-hop node, and a VPN SID or VPN label corresponding to the next-hop node.

16. The method according to claim 15, wherein
the ILM forwarding entry created by the border node comprises Equal-Cost Multipath Routing (ECMP) forwarding information or Fast Reroute (FRR) forwarding information generated according to the outgoing member forwarding information.

17. The method according to claim 15, wherein after assigning the VPN identity information to the VPN route corresponding to the VPN route information, adding the VPN identity information into the advertisement message, and sending the advertisement message to the second node by the border node, the method further comprises:

receiving, by the border node, a packet sent by the second node to the first node, performing a lookup according to a top label of the packet to find a matching ILM forwarding entry, and performing forwarding according to the label operation of the matching ILM forwarding entry and the VPN SID or VPN label corresponding to the next-hop node.

18. The method according to claim 17, wherein performing forwarding according to the label operation of the matching ILM forwarding entry and the VPN SID or VPN label corresponding to the next-hop node comprises at least one of the following:

in a case where the label operation of the ILM forwarding entry is swapping the incoming MPLS label to the outgoing SRv6 SID, by the border node, popping out the top label of the packet, encapsulating an IPv6 packet header, modifying the destination address of the packet into the VPN SID corresponding to the next-hop node, and forwarding the packet to the next-hop node;

in a case where the label operation of the ILM forwarding entry is swapping the incoming MPLS label to the outgoing MPLS label, by the border node, modifying the top label of the packet into the VPN label corresponding to the next-hop node, and forwarding the packet to the next-hop node.

19. A device for implementing Virtual Private Network (VPN) cross-domain, which is applied to a border node supporting Internet Protocol Version 6 Segment Routing (SRv6) capability, the device comprising a memory storing instructions and a processor in communication with the memory, wherein the processor is configured to execute the instruction to:

receive an advertisement message which carries VPN route information and is sent by a first node to a second node, wherein the first node and the second node belong to different domains; and assign VPN identity information to a VPN route corresponding to the VPN route information, add the VPN identity information into the advertisement message, and send the advertisement message to the second node, wherein the VPN identity information comprises at least one of: a VPN Segment ID (SID) and a VPN label;

create a corresponding local SID forwarding entry for the assigned VPN SID, and set that a forwarding behavior of the local SID forwarding entry comprises swapping an incoming SRv6 SID to an outgoing SRv6 SID or Multiprotocol Label Switching (MPLS) label.

* * * * *